United States Patent
Douglas et al.

(10) Patent No.: US 10,618,544 B2
(45) Date of Patent: Apr. 14, 2020

(54) RADIALLY PRELOADED RACK BEARING

(71) Applicant: STEERING SOLUTIONS IP HOLDING CORPORATION, Saginaw, MI (US)

(72) Inventors: Kevin P. Douglas, Bay City, MI (US); Ryan D. Harris, Birch Run, MI (US); Fred N. Golda, Bay City, MI (US); Justin R. Coats, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 107 days.

(21) Appl. No.: 15/594,909

(22) Filed: May 15, 2017

(65) Prior Publication Data

US 2017/0334478 A1 Nov. 23, 2017

Related U.S. Application Data

(60) Provisional application No. 62/339,670, filed on May 20, 2016.

(51) Int. Cl.
| | |
|---|---|
| *B62D 3/12* | (2006.01) |
| *B62D 7/16* | (2006.01) |
| *F16C 23/04* | (2006.01) |
| *B62D 5/22* | (2006.01) |
| *F16C 23/02* | (2006.01) |
| *B62D 3/02* | (2006.01) |

(52) U.S. Cl.
CPC ............. *B62D 3/126* (2013.01); *B62D 7/163* (2013.01); *F16C 23/045* (2013.01); *B60G 2204/418* (2013.01); *B60G 2204/4192* (2013.01); *B62D 3/02* (2013.01); *B62D 5/22* (2013.01); *B62D 7/16* (2013.01); *F16C 23/02* (2013.01)

(58) Field of Classification Search
CPC ....... B62D 3/126; B62D 7/163; F16C 23/045; B60G 2204/418; B60G 2204/4192
See application file for complete search history.

(56) References Cited

U.S. PATENT DOCUMENTS

| | | | |
|---|---|---|---|
| 3,762,240 | A | 10/1973 | Adams |
| 5,906,138 | A | 5/1999 | Kostrzewa |
| 5,937,703 | A | 8/1999 | Engler |
| 6,392,418 | B1 | 5/2002 | Mir et al. |

(Continued)

FOREIGN PATENT DOCUMENTS

| | | |
|---|---|---|
| CN | 1278219 A | 12/2000 |
| CN | 1675484 A | 9/2005 |

(Continued)

OTHER PUBLICATIONS

RD435128A, Anonymous, Speed-sensitive damping system for rack and pinion gear assembly and/or general preloaded bearing adjustment, includes damping feature between rack bearing and adjuster plug, Jul. 10, 2000, see entire document (Year: 2000).*

(Continued)

*Primary Examiner* — Faye M Fleming
(74) *Attorney, Agent, or Firm* — Dickinson Wright PLLC

(57) ABSTRACT

A rack and pinion steering system includes a housing, a rack, a pinion gear, and a radially preloaded rack bearing. The rack is supported by the housing, and the pinion gear is meshed to the rack. The radially preloaded rack bearing is supported and preloaded to the housing and is preloaded to the rack.

17 Claims, 5 Drawing Sheets

(56) References Cited

U.S. PATENT DOCUMENTS

| | | | |
|---|---|---|---|
| 7,042,227 B2 | 5/2006 | Mir et al. | |
| 7,584,816 B2 | 9/2009 | Miyajima et al. | |
| 7,849,957 B2 | 12/2010 | Hara et al. | |
| 9,296,412 B2 * | 3/2016 | Witting | B62D 3/123 |
| 9,802,639 B2 * | 10/2017 | Tsukasaki | B62D 3/126 |
| 2009/0234538 A1 | 9/2009 | Ta et al. | |
| 2017/0346424 A1 | 11/2017 | Pramod et al. | |
| 2018/0257696 A1 * | 9/2018 | Ikeda | B62D 3/126 |

FOREIGN PATENT DOCUMENTS

| | | | | |
|---|---|---|---|---|
| CN | 101044341 A | | 9/2007 | |
| CN | 101314361 A | | 12/2008 | |
| CN | 102145708 A | | 8/2011 | |
| CN | 102837728 A | | 12/2012 | |
| DE | 102006061501 A1 | * | 6/2008 | B62D 3/126 |
| JP | H07232650 A | | 9/1995 | |
| KR | 20080043027 A | | 5/2008 | |

OTHER PUBLICATIONS

Chinese First Office from the Chinese Patent Office for CN Application No. 201710363597X dated Nov. 22, 2018, 14 pages, English Translation Included.
Second Office Action regarding related CN App. No. 201710363597X; English translation included; dated Sep. 4, 2019.

* cited by examiner

RADIALLY PRELOADED RACK BEARING

CROSS-REFERENCES TO RELATED APPLICATIONS

This patent application claims priority to U.S. Provisional Patent Application Ser. No. 62/339,670, filed May 20, 2016 which is incorporated herein by reference in its entirety.

BACKGROUND OF THE INVENTION

A rack and pinion steering system is a common type of system often used in the automotive industry. A typical rack and pinion steering system functions to convert rotational motion to linear motion, and may include an elongated steering rack (i.e., toothed bar), tie rods, a steering shaft and a pinion gear. The tie rods that generally connect to the respective front tires are attached to the opposite ends of the steering rack. The pinion gear is attached to an end of the steering shaft and a steering wheel is attached to an opposite end of the steering shaft. The pinion gear operably meshes with the teeth of the steering rack. Turning of the steering wheel turns the pinion gear, which in-turn, moves the rack in a linear fashion.

Many system components generally facilitate the operable meshing of the pinion gear to the rack and may include a rack bearing (i.e., rack yoke or shoe), housing, and other components. Known designs and configurations supporting this meshed connection may tend to make undesirable noises, provide a less than desirable steering feel performance, add to maintenance complexity, and other issues.

Accordingly, it is desirable to improve the operable, meshed, connection and/or related components to, for example, minimize system noise, improve system feel, and optimize robustness.

SUMMARY OF THE INVENTION

In one exemplary and non-limiting embodiment of the present disclosure, a rack and pinion steering system includes a housing, a rack, a pinion gear, and a radially preloaded rack bearing. The rack is supported by the housing, and the pinion gear is meshed to the rack. The radially preloaded rack bearing is supported and preloaded to the housing and is preloaded to the rack In another exemplary embodiment, a rack bearing for a rack and pinion steering system includes first and second semi-cylindrical segments. The second semi-cylindrical segment is operably coupled to the first semi-cylindrical segment for radial expansion and contraction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
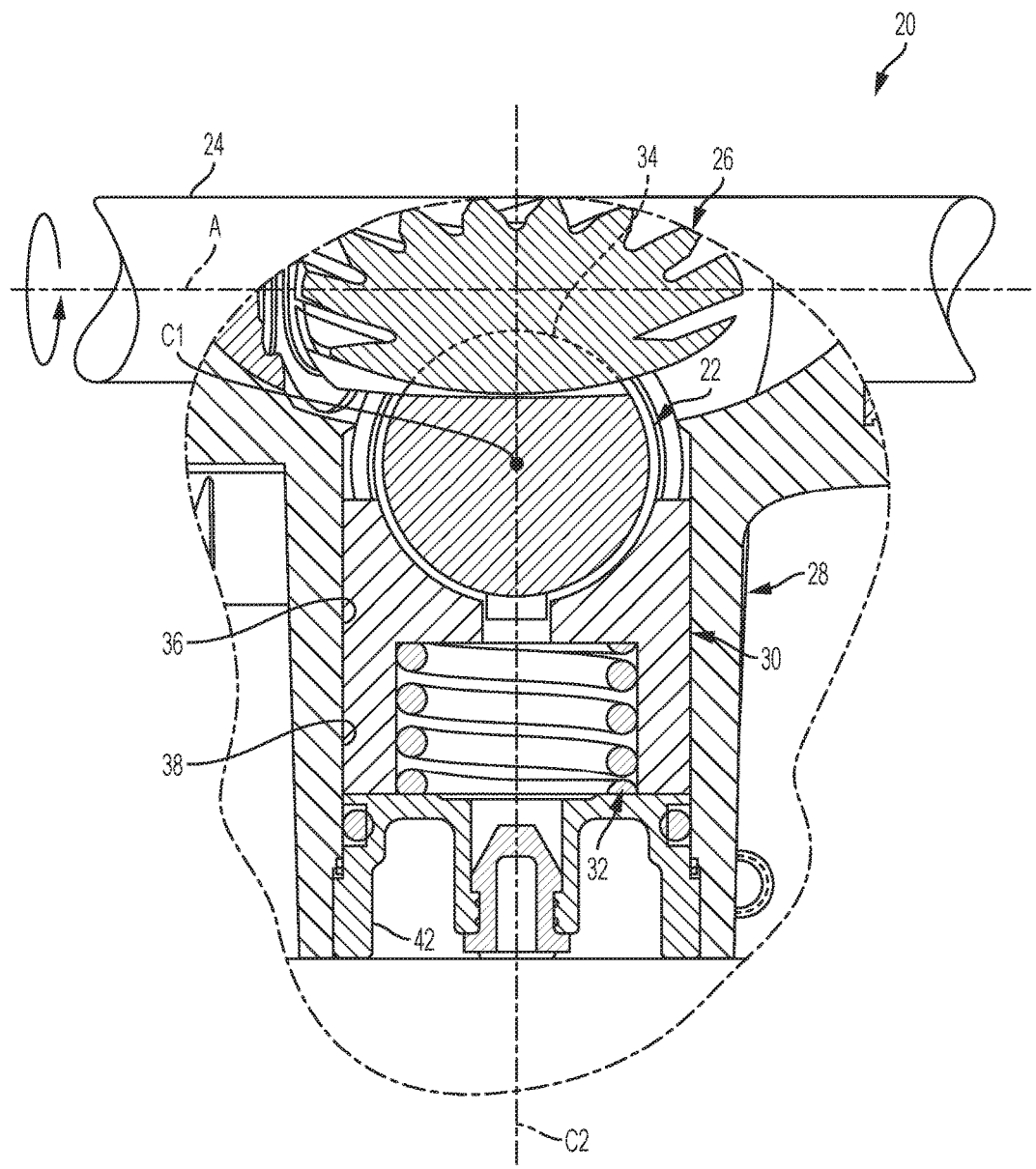
FIG. 1 is a partial cross section of a rack and pinion steering system in accordance with an exemplary embodiment of the present disclosure.

Referring now to the Figures, where the invention will be described with reference to specific embodiments, without limiting same, a rack and pinion steering system 20 that may be used for an automobile, facilitates the conversion of rotational motion to linear motion. Referring to FIG. 1, the rack and pinion steering system 20 may include an elongated steering rack 22 (i.e., toothed bar), two tie rods (not shown), a steering shaft 24, a pinion gear 26, a housing 28, a rack bearing 30, and a resiliently flexible member 32 adapted to exert a biasing force in an axial direction with respect to a centerline C2. In one example, member 32 may be a coiled spring. Each tie rod may span between and is operably connected to a respective end of the rack 22 and a respective tire (e.g., front tire), not shown. The pinion gear 26 may be attached to one end of the steering shaft 24 for rotation about an axis A, and a steering wheel (not shown) may be attached to an opposite end. The pinion gear 26 is constructed and arranged to operably mesh with teeth 34 of the steering rack 22. Turning of the steering wheel rotates the pinion gear 26, which in-turn moves the rack 22 in a substantially linear fashion along a centerline C1.

Figure 2:
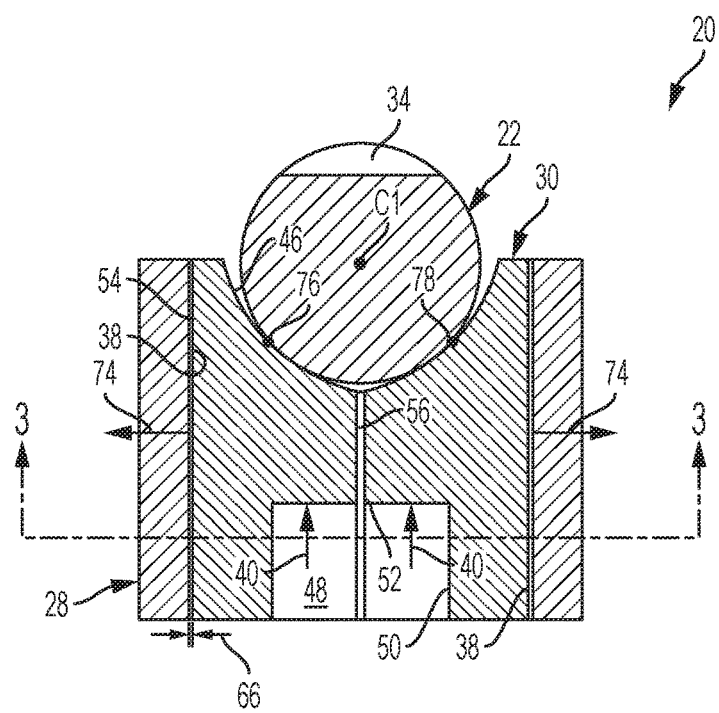
FIG. 2 is a cross section of the rack and pinion steering system similar to FIG. 1 but with components removed to show detail.
Figure 3:
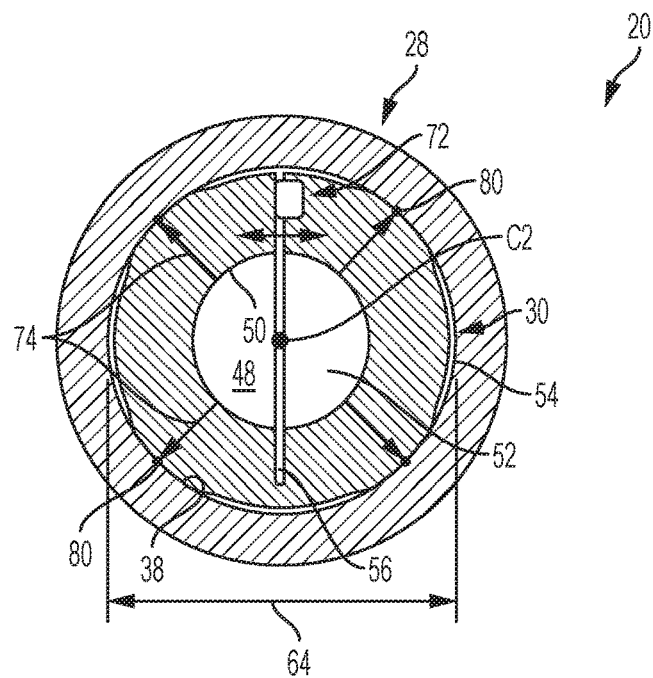
FIG. 3 is a cross section of the rack and pinion steering system viewing in the direction of arrows 3-3 in FIG. 2.
Figure 4:
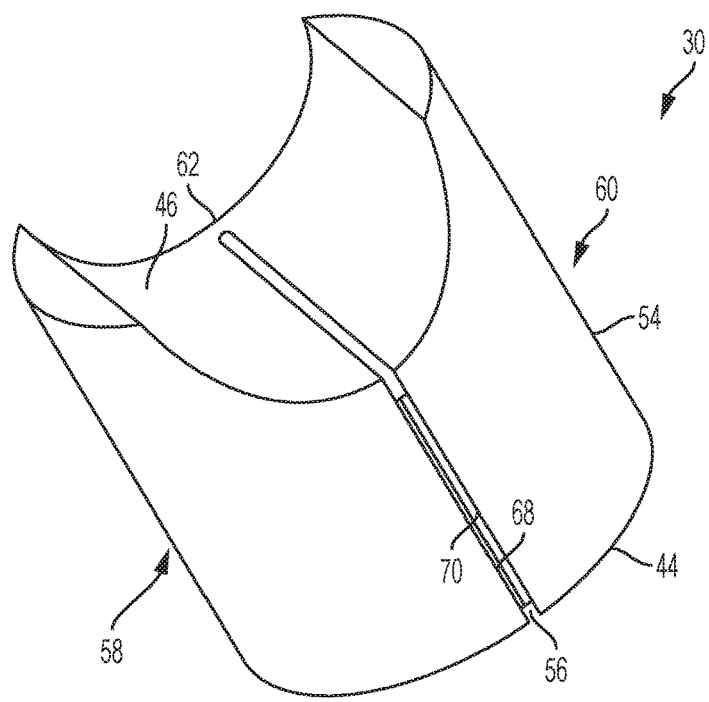
FIG. 4 is a perspective view of a rack bearing of the rack and pinion steering system viewing a first end face.

Referring to FIGS. 1 through 3, the rack bearing 30 is adapted to support the rack 22, and preload the meshed engagement between the pinion gear 26 and the rack 22. The rack bearing 30 may generally and slideably fit within a substantially cylindrical bore 36 having boundaries defined by an inner, substantially cylindrical, surface 38 of the housing 28. The bore 36 and the surface 38 may be substantially centered to a centerline C2 that may be normal to and/or may intersect the centerline C1. Because the rack bearing 30 axially slides within the bore 36 of the housing 28, the rack bearing 30 is able to transfer the axial preload (see arrows 40 in FIG. 2) of the adjustor spring 32 (see FIG. 1) to the meshed engagement. The amount of sliding motion may be limited by the adjustment of an adjuster plug 42 relative to the rack bearing 30 that may be threadably engaged to the housing 28.

Referring to FIGS. 2 through 5, the rack bearing 30 may include an axial base end face 44 that may be annular in shape, and an opposite rack contact end face 46 that may be concave in shape for sliding contact with the rack 22. The rack bearing 30 may include a bore 48 that may be blind and has boundaries defined by a substantially cylindrical, inner, face 50 and a spring seat 52 of the rack bearing 30. The adjustor spring 32 may exert the axial preload 40 directly between the spring seat 52 and the adjuster plug 42. A substantially cylindrical, outer, face 54 of the rack bearing 30, may span axially with respect to the centerline C2 between the end faces 44, 46, and radially opposes the inner surface 38 of the housing 28.

The rack bearing 30 may further include a slot 56 that may be coplanar to the centerline C2 (i.e., lies within a common imaginary plane), may be in communication with the blind bore 48, and may communicate through the outer face 54, the inner face 50, the end faces 44, 46 and the spring seat 52. More specifically, the slot 56 may communicate through two diametrically opposed locations of the inner face 50 and one circumferential location of the outer face 54. Because the slot does not communicate through two diametrically opposed locations of the outer face 54, the rack bearing 30 may generally be one unitary and homogeneous piece having two semi-cylindrical segments 58, 60 attached by an integral hinge portion 62 of the rack bearing 30. That is, the slot 56 segments most of the rack bearing 30 leaving a small portion of flexible material which functions as the hinge portion 62.

The hinge portion 62 may be generally elongated extending axially with respect to the centerline C2. Relatively small portions of the outer face 54, and the end faces 44, 46 may be carried by the integral hinge portion 62. In one example, the rack bearing 30 may be made of an injection molded polymer.

Referring to FIGS. 2 and 3, an outside diameter (see arrow 64) of the rack bearing 30 may be sized to achieve an initial, circumferentially, low clearance (see arrows 66) measured between the inner surface 38 of the housing 28 and the outer face 54 of the rack bearing 30. Radial compression of the rack bearing 30, via flexing of the hinge portion 62 may generally increase the clearance 66, and radial expansion of the bearing may generally decrease the clearance 66 until the clearance is no longer circumferentially continuous, and the inner surface 38 and the outer face 54 at the lobes 80 are in direct sliding contact with one-another. It is contemplated and understood that the hinge portion 62 may be adapted to exert a biasing force upon the semi-cylindrical segments 58, 60 causing the segments to move radially outward.

Figure 5:
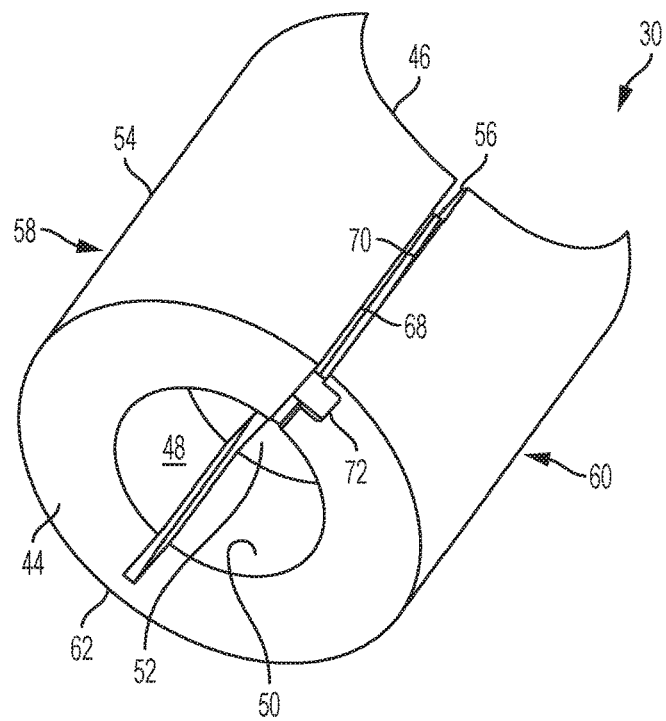
FIG. 5 is another perspective view of the rack bearing viewing an opposite second end face.

Referring to FIGS. 3 and 5, boundaries of the slot 56 may be defined by opposing sides 68, 70 of the respective semi-cylindrical segments 58, 60. The rack and pinion system 20 may further include at least one resilient member 72 that extends between the sides 68, 70 and is in biased contact with each segment 58, 60 to exert a force (see arrows 74 in FIGS. 2 and 3) that biases the segments 58, 60 radially outward. In general, the resilient member 72 may be proximate to the outer face 54 and is diametrically opposite the hinge portion 62. The resilient member 72 may be made of rubber, or a rubber-like material. Another example of the member 72 may be a resilient spring.

During assembly of the rack bearing 30 into the housing 28, the rack bearing 30 may be radially contracted against the biasing force 74 of the resilient member 72, thereby further compressing the member between the sides 68, 70 of the respective semi-cylindrical segments 58, 60. With the resilient member 72 appreciably compressed, the clearance 66 between the inner surface 38 of the housing 28 and the outer face 54 of the rack bearing 30 is generally created enabling axial insertion of the rack bearing 30 into the bore 36 of the housing 28. Once inserted, release of the rack bearing 30 may cause the resilient member 72 to expand, thereby radially expanding the rack bearing 30 until the outer face 54 of the rack bearing 30 contacts the inner surface 38 of the housing 28.

The magnitude of the clearance 66, the compressibility (i.e., compression coefficient) of the resilient member 72, and other factors may be appropriately designed and sized to compensate for any coefficients of thermal expansion between components (e.g., the rack bearing 30 and the housing 28). Thermal expansion interactions between components is, at least in-part, dependent upon material types. For example, the rack bearing 30 may be made of a polymer and the housing 28 may be made of metal. One example of a metal may be aluminum. These material choices may be ideal for weight reduction, and the novel configuration of components may prevent or reduce any likelihood of the rack bearing 30 seizing to the housing 28.

The radial preload rack bearing 30 may provide a line-to-line fit between rack bearing 30 and housing 28 during changes in temperature. As temperature increases, and if the rack bearing 30 grows more than the housing 28, the rack bearing may squeeze in slightly. As temperature decreases and the rack bearing 30 shrinks more than the housing 28, the resilient member 72 may expand the rack bearing 30 against the housing 28.

Because the radial preloaded rack bearing 30 may compensate for differences in size between the rack bearing outside diameter and the housing inner surface diameter, the housing inner surface tolerance may be increased. This will reduce the number of machining operations and cycle time. Further, the rack bearing 30 may not require any secondary machining or other secondary sizing operations after the injection molding process when the rack bearing 30 is made of a polymer.

During normal operation and to limit system rattle and clunk, and optimize system 'feel' performance, the rack bearing 30 may maintain a line-to-line fit to the housing inner surface 38 under all temperature and operating conditions. Also during operation, the adjustor spring 32 may bear upon the spring seat 52 of the rack bearing 30 along centerline C2. In-turn, the contact end face 46 of the rack bearing 30 bears upon rack 22. The profile of the contact end face 46 may generally match the profile of the rack 22 and/or may include general contact points 76, 78 (see FIG. 2) causing the rack 22 and the rack bearing 30 to contact one-another at points which may be about forty-five (45) degrees offset from one or both centerlines C1, C2. In general, the contact points 76, 78 may be caused by the end face 46 of the rack bearing 30 having a larger radius of curvature than a radius of curvature of the opposing outer cylindrical surface of the steering rack 22.

The arrangement or orientation of the contact points 76, 78 may facilitate a radially outward spread of the rack bearing 30 and may compel the rack bearing 30 to contact the inner surface 38 of the housing 28. In one embodiment, a plurality of lobes 80 (i.e., four illustrated) may be circumferentially spaced about centerline C2 and carried between the outer face 54 of the rack bearing 30 and the inner surface 38 of the housing 28. In one embodiment, the rack bearing 30 may carry the lobes 80, and the inner surface 38 of the housing 28 may be cylindrical and/or more cylindrical than the outer face 54 of the rack bearing 30. Although not illustrated, it is contemplated and understood that the semi-cylindrical segments 58, 60 (i.e., substantially cylindrical) may each include only one lobe 80, with the total of two lobes being circumferentially space apart form on-another by about one-hundred and eighty degrees (180 degrees).

The lobes 80 may facilitate stability without having to maintain high conformity between a circular rack-bearing outside diameter and the housing bore 36. It is contemplated and understood that in some embodiments, use of the lobes 80 and/or use of the contact points 76, 78, enables some design flexibility to slightly deviate from a substantially cylindrical shape of the face 54 and/or the end face 46 of the rack bearing 30.

In one embodiment, the resilient member 72 may not be needed due to operating characteristics. For example, and in operation, as a rack force increases due to a steering maneuver, or input from a vehicle chassis, the preload force 74 between the rack bearing 30 and the housing 28 may increase proportionally. The more the rack bearing 30 is loaded, the more of a delashing force is applied. In cases where the radial preload is sufficient to prevent rattle while maintaining smooth operation, the resilient member 72 may not be needed.

Figure 6:
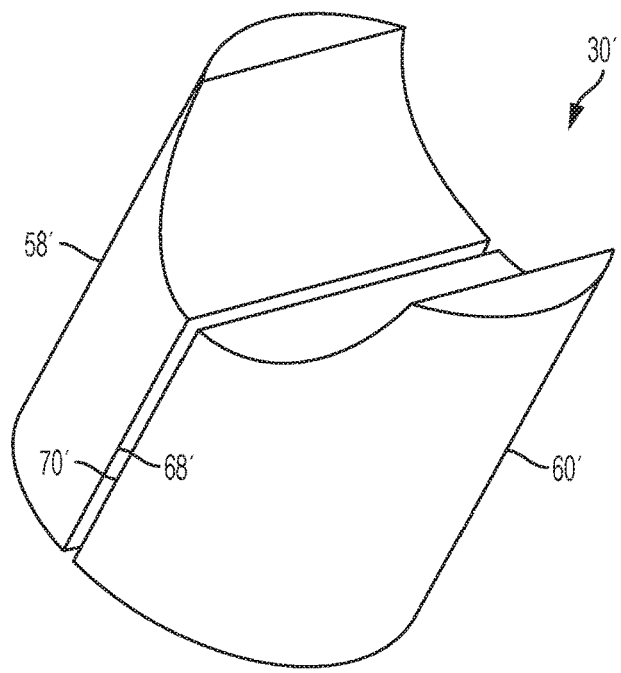
FIG. 6 is a perspective view of a second embodiment of a rack bearing.
Figure 7:
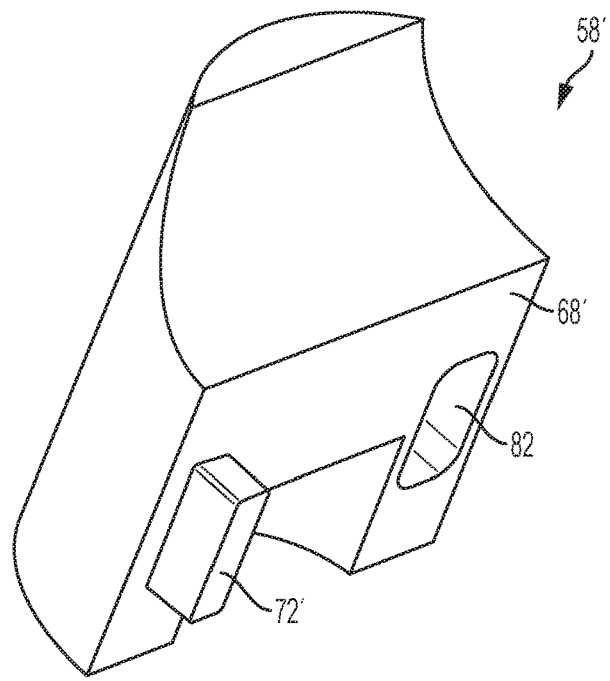
FIG. 7 is a perspective view of a semi-cylindrical segment of the rack bearing.

Referring to FIGS. 6 and 7, a second embodiment of a rack bearing is illustrated wherein like elements to the first embodiment have like identifying numerals except with the suffix of a prime symbol. A rack bearing 30' may include two separate semi-cylindrical segments 58', 60' having respective sides 68', 70' that oppose one-another. For manufacturing simplicity and cost reduction, each segment 58', 60' may be identical. A first key 72' may project out from each side 68', 70' for receipt in a recess 82 defined by the opposing, other, side 70', 68'. The keys 72' are generally adapted to orientate, and maintain orientation, between the segments 58', 60' as the segments radially expand and contract. In one example, the key 72' may be one unitary and homogeneous piece to the respective segments 58', 60'. In another example, the key 72' may be a resilient member. Examples of a resilient member may include an elastomeric material (e.g., rubber), a spring, and the like.

Figure 8:
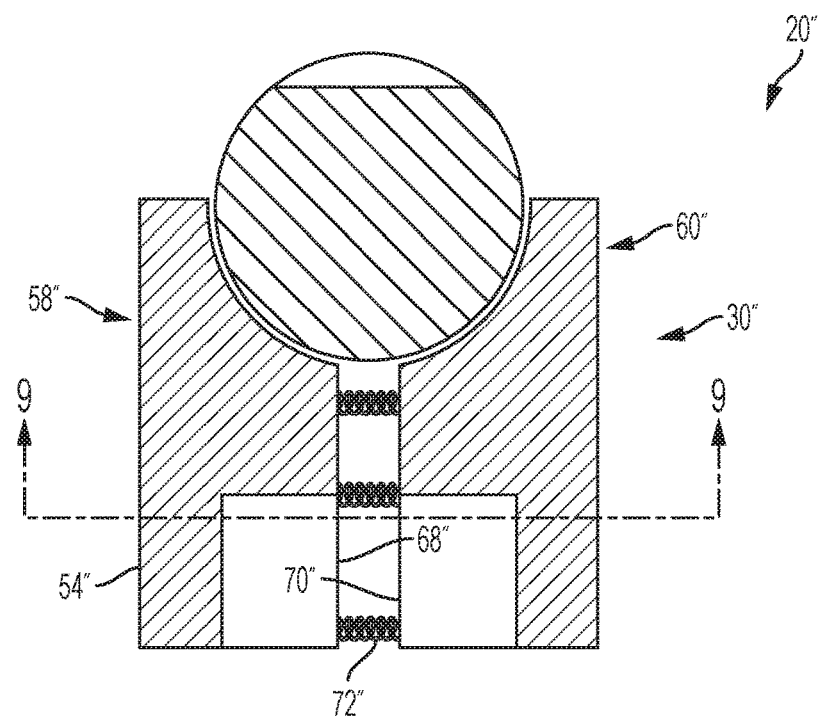
FIG. 8 is cross section of a third embodiment of a rack and pinion steering system.
Figure 9:
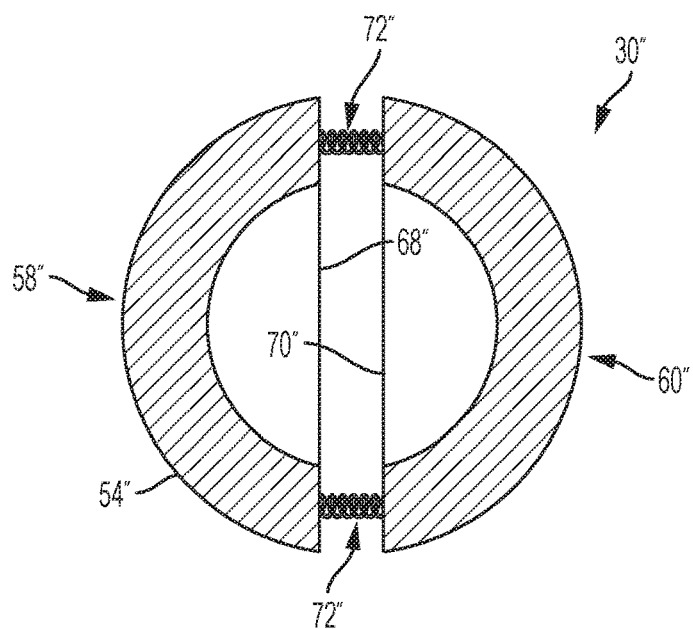
FIG. 9 is a cross section of a rack bearing of the rack and pinion steering system viewing in the direction of arrows 9-9 in FIG. 8.

Referring to FIGS. 8 and 9, a third embodiment of the rack bearing is illustrated wherein like elements to the first and second embodiments have like identifying numerals except with the suffix of a double prime symbol. A rack bearing 30" may include two separate semi-cylindrical segments 58", 60" similar to the second embodiment. The segments may include respective sides 68", 70" that oppose one-another. For manufacturing simplicity and cost reduction, each segment 58", 60" may be identical. A plurality of resilient members 72" (i.e., six illustrated) may extend between, and are in biased contact with, each side 68", 70".

The resilient members 72" may be orientated to assure a desired radial expansion. For example, during radial expansion and contraction, the opposing sides 68", 70" may remain substantially parallel to one another. In one example, a first set of three resilient members 72" may be axially spaced apart from one-another, circumferentially aligned to one-another, and proximate to a substantially cylindrical face 54". A second set of three resilient members 72" may be axially spaced apart from one-another, circumferentially aligned to one-another, and proximate to the substantially cylindrical face 54". The first set of resilient members 72" may be circumferentially spaced from the second set of resilient members 72" by about one-hundred and eighty degrees (180 degrees). As illustrated, the resilient members 72" are coiled springs; however, the members may be made of any resiliently expandable and compressible material.

Advantages and benefits of the present disclosure includes a design that compensates for tolerance stack and allows greater housing diameter tolerance thus reducing manufacturing cost and time. The present design facilitates use of a polymer rack bearing assembly by compensating for thermal expansion difference between aluminum housing and plastic rack bearing assembly components. Other advantages include a friction force between the rack bearing 30 and housing 28 that provides damping in rack-and-pinion separating direction, and the elimination of any need for more traditional radial o-rings.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rack and pinion steering system comprising:
    a housing;
    a rack supported by the housing;
    a pinion gear meshed to the rack; and
    a radially preloaded rack bearing supported and preloaded to the housing and preloaded to the rack, wherein the rack is constructed and arranged to move along a first centerline and the rack bearing extends along a second centerline that traverses the first centerline, wherein the rack bearing is preloaded axially against the rack and preloaded radially against the housing with respect to the second centerline, and wherein the rack bearing includes first and second semi-cylindrical segments co-projecting radially outward from the rack and with respect to the first centerline and being spaced and biased radially outward from one-another with respect to the second centerline, wherein the rack bearing includes an axially extending hinge portion attached to the first and second semi-cylindrical segments.

2. The rack and pinion steering system set forth in claim 1, wherein the rack bearing is in direct contact with the housing.

3. The rack and pinion steering system set forth in claim 1 further comprising:
    a spring constructed and arranged to bias the rack bearing axially against the rack.

4. The rack and pinion steering system set forth in claim 3, further comprising:
    a plug engaged to the housing, wherein the spring is resiliently compressed axially with respect to the second centerline between the rack bearing and the plug.

5. The rack and pinion steering system set forth in claim 1, wherein the rack bearing includes a resilient member constructed and arranged to bias the first semi-cylindrical segment radially away from the second semi-cylindrical segment.

6. The rack and pinion steering system set forth in claim 1, wherein the rack bearing is one unitary and homogeneous piece.

7. The rack and pinion steering system set forth in claim 6, wherein the rack bearing is made of injection molded polymer.

8. A rack and pinion steering system comprising:
    a housing;
    a rack supported by the housing;
    a pinion gear meshed to the rack; and
    a radially preloaded rack bearing supported and preloaded to the housing and preloaded to the rack, wherein the rack is constructed and arranged to move along a first centerline and the rack bearing extends along a second centerline that traverses the first centerline, wherein the rack bearing is preloaded axially against the rack and preloaded radially against the housing with respect to the second centerline, wherein the rack bearing includes first and second semi-cylindrical segments co-projecting radially outward from the rack and with respect to the first centerline and being spaced and biased radially outward from one-another with respect to the second centerline, wherein the first and second semi-cylindrical segments are diametrically opposed to one-another, wherein the first and second semi-cylindrical segments are separate segments, wherein the first semi-cylindrical segment includes a first side and the second semi-cylindrical segment includes a second side that opposes the first side, and wherein rack bearing includes circumferentially spaced first and second keys extending between the first and second sides for orientating the first semi-cylindrical segments with the second semi-cylindrical segment.

9. The rack and pinion steering system set forth in claim 8, wherein the first and second keys are resilient members.

10. The rack and pinion steering system set forth in claim 8, wherein the first key projects outward from the first face for receipt in a first recess defined by the second face.

11. The rack and pinion steering system set forth in claim 10, wherein the second key projects outward from the second face for receipt is a second recess defined by the first face.

12. The rack and pinion steering system set forth in claim 8, wherein the rack bearing is in direct contact with the housing.

13. The rack and pinion steering system set forth in claim 8 further comprising:

a spring constructed and arranged to bias the rack bearing axially against the rack.

14. The rack and pinion steering system set forth in claim 13, further comprising:

a plug engaged to the housing, wherein the spring is resiliently compressed axially with respect to the second centerline between the rack bearing and the plug.

15. The rack and pinion steering system set forth in claim 8, wherein the rack bearing includes a resilient member constructed and arranged to bias the first semi-cylindrical segment radially away from the second semi-cylindrical segment.

16. A rack bearing for a rack and pinion steering system comprising:

a first semi-cylindrical segment including a first concave end face adapted to contact the rack and a first side spanning axially outward from the first concave end face;

a second semi-cylindrical segment operably coupled to the first semi-cylindrical segment for radial expansion and contraction, and including a second concave end face adapted to contact the rack and a second side spanning axially outward from the second concave end face, and the first and second sides defining a slot; and a resilient member extending between diametrically opposing first and second sides of the respective first and second semi-cylindrical segments, and in biased contact with the first and second semi-cylindrical segments.

17. The rack bearing set forth in claim 16, wherein the rack bearing is made of polymer.

* * * * *